(12) United States Patent
Accursi

(10) Patent No.: US 10,099,849 B2
(45) Date of Patent: Oct. 16, 2018

(54) CAPSULE AND SYSTEM FOR MAKING BEVERAGES

(71) Applicant: CAFFITALY SYSTEM S.P.A., Gaggio Montano (BO) (IT)

(72) Inventor: Giovanni Accursi, Porretta Terme (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 194 days.

(21) Appl. No.: 15/103,558

(22) PCT Filed: Nov. 18, 2014

(86) PCT No.: PCT/IB2014/066115
§ 371 (c)(1),
(2) Date: Jun. 10, 2016

(87) PCT Pub. No.: WO2015/087180
PCT Pub. Date: Jun. 18, 2015

(65) Prior Publication Data
US 2016/0311608 A1    Oct. 27, 2016

(30) Foreign Application Priority Data

Dec. 11, 2013 (IT) .............................. VR2013A0276

(51) Int. Cl.
*A47J 31/36* (2006.01)
*B65D 85/804* (2006.01)
(Continued)

(52) U.S. Cl.
CPC ...... *B65D 85/8043* (2013.01); *A47J 31/0668* (2013.01); *A47J 31/0673* (2013.01);
(Continued)

(58) Field of Classification Search
CPC .......................... A47J 31/3628; A47J 31/3695
(Continued)

(56) References Cited

U.S. PATENT DOCUMENTS

| | | | | |
|---|---|---|---|---|
| 6,550,371 B1 * | 4/2003 | Del Bon | ............. | A47J 31/0642 426/111 |
| 8,215,228 B2 * | 7/2012 | Skalski | ............... | A47J 31/0668 222/129.1 |
| 8,677,887 B2 * | 3/2014 | Crescenzi | ............. | A47J 31/303 426/425 |

(Continued)

FOREIGN PATENT DOCUMENTS

| | | | | |
|---|---|---|---|---|
| DE | 10 2010 027 485 A1 | | 1/2012 | |
| EP | 2284102 | * | 10/2009 | .......... A47J 31/3695 |

(Continued)

*Primary Examiner* — Reginald L Alexander
(74) *Attorney, Agent, or Firm* — Pearne & Gordon LLP

(57) ABSTRACT

A capsule for making beverages, containing a powdered food substance which can be extracted by passing hot water through it, the capsule (1) comprising a cup-shaped containment body (3) which inside it forms a chamber (2) for housing (16) the powdered food substance, and which comprises a bottom portion (7) through which, in use, hot water can be fed into the capsule (1), and a lateral wall (4) connected to the bottom portion (7) and forming an access opening for accessing the chamber (2), and a closing element (9) fixed to the lateral wall (4) at the access opening for closing it, and through which, in use, the beverage can come out of the chamber (2). The capsule (1) also comprises a filter element (10) which is permeable to water and positioned inside the chamber (2) between the powdered food substance and the bottom portion (7), the filter element (10) resting on the bottom portion (7) and being free to move away from the latter towards the inside of the chamber (2) except for the resistance applied by the powdered food substance. The invention also relates to a system for making beverages which comprises the capsule (1).

17 Claims, 5 Drawing Sheets

(51) Int. Cl.
*A47J 31/06* (2006.01)
*A47J 31/40* (2006.01)

(52) U.S. Cl.
CPC ....... *A47J 31/3628* (2013.01); *A47J 31/3695* (2013.01); *A47J 31/407* (2013.01)

(58) Field of Classification Search
USPC .................................................. 99/295, 323
See application file for complete search history.

(56) References Cited

U.S. PATENT DOCUMENTS

| | | |
|---|---|---|
| 2003/0217643 A1 | 11/2003 | Masek et al. |
| 2007/0068395 A1 | 3/2007 | Masek et al. |
| 2009/0126578 A1* | 5/2009 | Amann ............... A47J 31/3623 99/295 |
| 2010/0303964 A1* | 12/2010 | Beaulieu ............ B65D 85/8043 426/77 |
| 2011/0185910 A1 | 8/2011 | Ryser |
| 2011/0274794 A1 | 11/2011 | Gerbaulet et al. |
| 2012/0070543 A1 | 3/2012 | Mahlich |
| 2012/0210876 A1* | 8/2012 | Glucksman ......... A47J 31/4407 99/281 |
| 2013/0084363 A1 | 4/2013 | Krueger et al. |
| 2015/0314954 A1 | 11/2015 | Empl |

FOREIGN PATENT DOCUMENTS

| | | |
|---|---|---|
| EP | 2 133 285 A1 | 12/2009 |
| WO | 2013/136209 A1 | 9/2013 |
| WO | 2014090567 A1 | 6/2014 |

* cited by examiner

CAPSULE AND SYSTEM FOR MAKING BEVERAGES

This invention relates to a capsule for making beverages, in particular a capsule comprising inside it a powdered food substance which allows a beverage to be made by passing hot water through it. This invention also relates to a system for making beverages, comprising said capsule.

In particular, although the invention may be applied both in the case of substances intended to allow the beverage to be made after they have been practically completely dissolved in the hot water, and in the case of powdered food substances intended to allow the beverage to be made by extraction (such as coffee powder), it is preferably intended for the latter type of capsules.

In more detail, this invention aims to define a new capsule which can advantageously be used in the coffee machines of a system currently widespread on the market in which the capsules are currently constituted of a cup-shaped aluminium body, closed at the top by a sheet of aluminium which is less resistant. The coffee machines used in said system comprise a first part and a second part which are mobile one relative to the other between an operating position and a home position. The first part forms a housing or housing in which a capsule can be inserted, the inside of the housing being equipped with piercing elements which in use pierce a bottom portion of the cup-shaped body of the capsule. In the operating position, the first part and the second part clamp the capsule in the housing, creating a watertight seal outside the capsule. In this way, when pressurised hot water is fed into the housing, it penetrates the capsule through the holes made by the piercing element, and causes an increase in the internal pressure which makes the upper closing sheet swell, said upper closing sheet then being torn against piercing means which are fixed to the second part. At that point the beverage can come out of the capsule and be made to flow to the outside of the machine through suitable ducts.

However, the prior art system is not without disadvantages. In particular, often for making espresso coffee, the prior art system appears unable to make a beverage with organoleptic properties close enough to those which can be obtained using a professional bar-type machine, which would be desirable.

In particular, in the prior art system the flow of water through the capsule is not uniform enough through all of the powder and for the entire duration of the beverage making cycle. Moreover, in many cases the powdered food substance does not have the correct degree of compression for optimum supplying.

In this context, the technical purpose which forms the basis of this invention is to provide a capsule for making beverages which overcomes the above-mentioned disadvantages.

In particular, the technical purpose of this invention is to provide a capsule for making beverages which guarantees that all of the powdered food substance is made thoroughly wet for the entire duration of beverage supplying.

It is also the technical purpose of this invention to provide a capsule for making beverages which guarantees improved compression of the powdered food substance during extraction.

The technical purpose specified and the aims indicated are substantially achieved by a capsule for making beverages as described in the appended claims.

Further features and the advantages of this invention are more apparent in the detailed description below, with reference to several preferred, non-limiting embodiments of a capsule for making beverages, illustrated in the accompanying drawings, in which.

Figure 1:
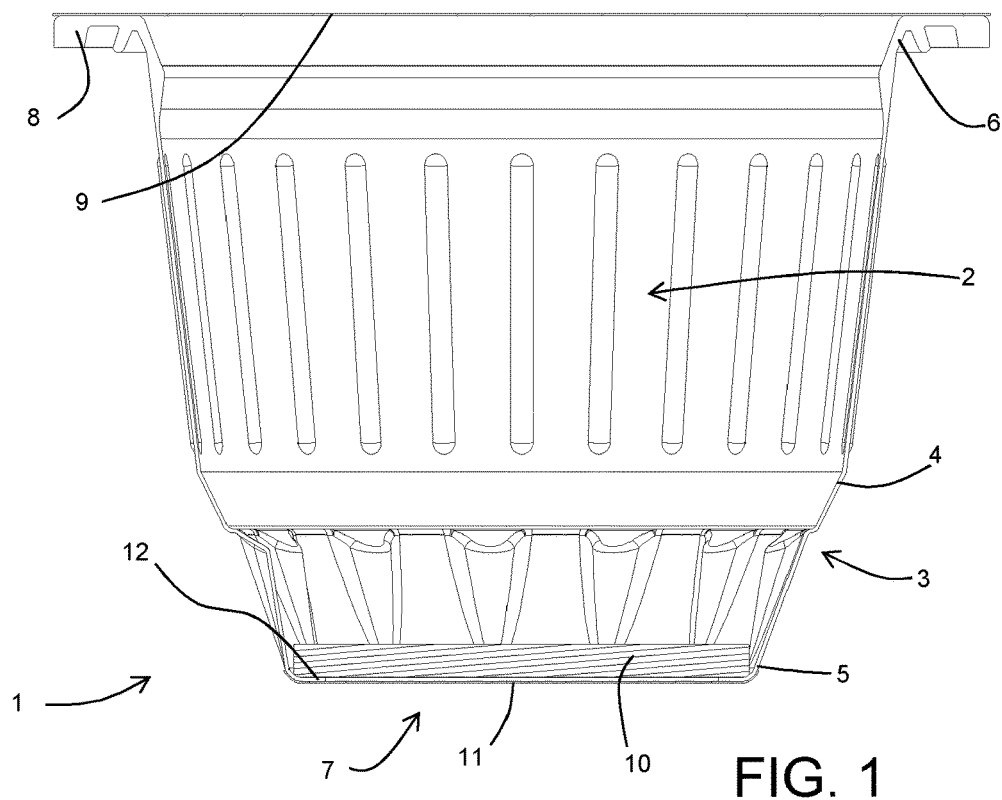
FIG. 1 is a schematic axial section of a first embodiment of a capsule made according to this invention.
Figure 2:
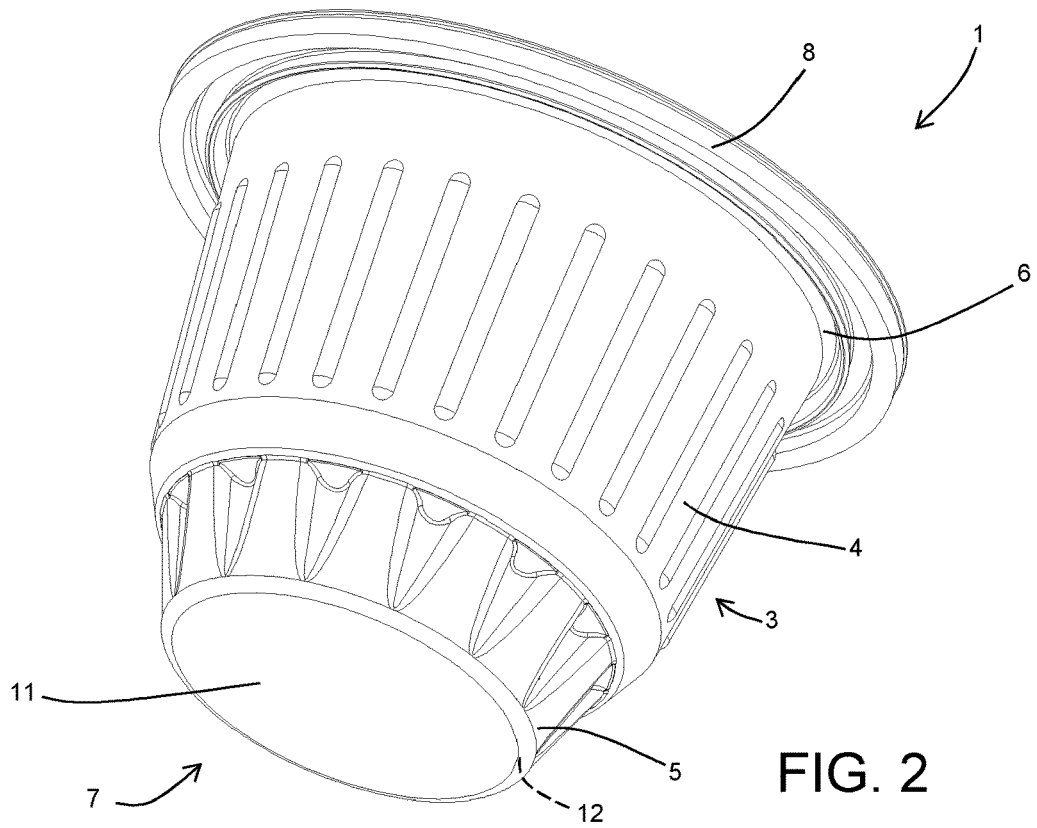
FIG. 2 is an axonometric bottom view of the capsule of FIG. 1.
Figure 3:
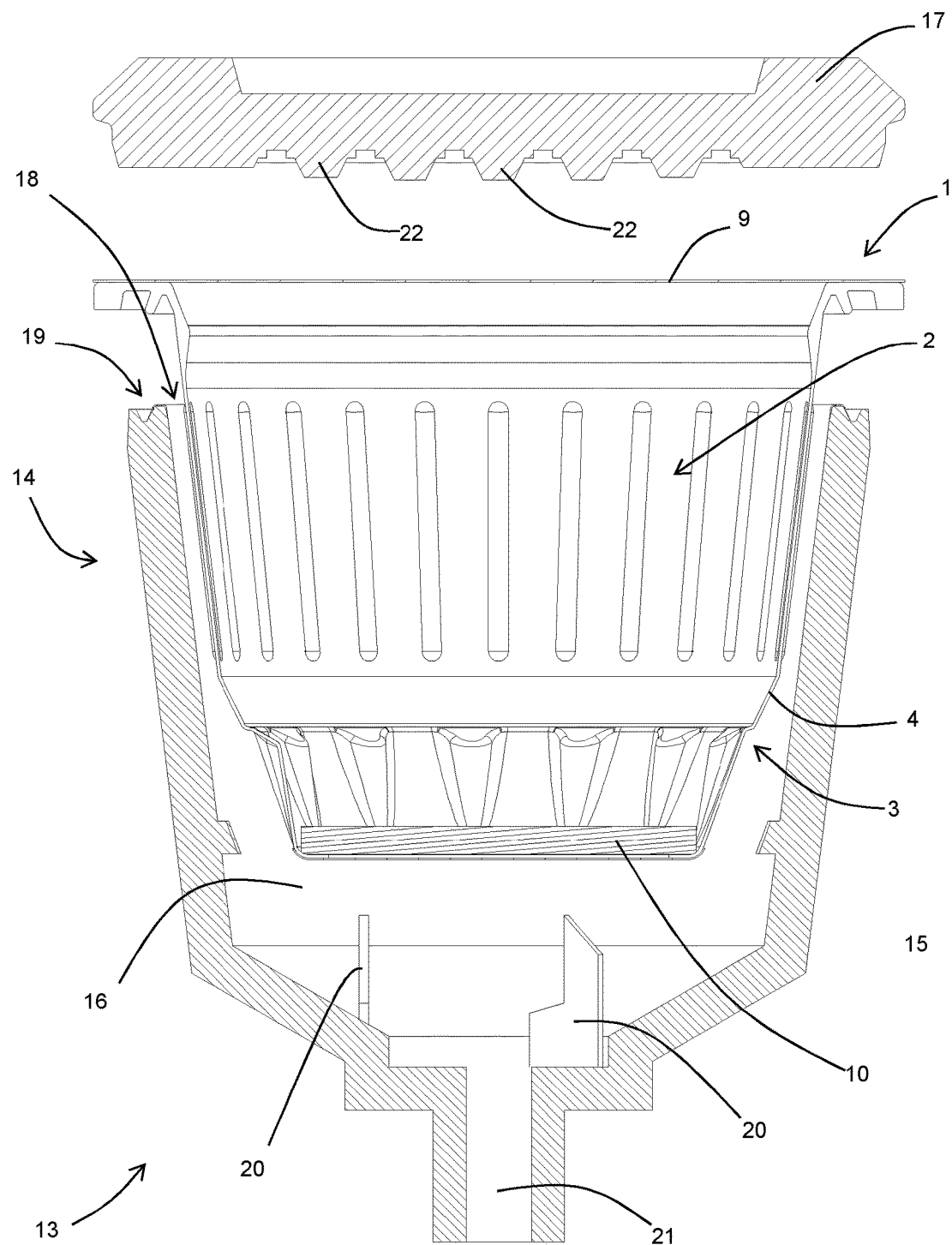
FIG. 3 is an axial section of the capsule of FIG. 1 partly inserted in a device according to this invention, positioned in a non-operating configuration.

With reference to the accompanying drawings, the numeral 1 denotes in its entirety a capsule for making beverages in accordance with this invention. Similarly to the prior art capsules, as indicated, the capsule according to this invention also contains a powdered food substance (not illustrated in the accompanying drawings) which allows a beverage to be made by passing hot water through it, and which is contained in a housing chamber 2 formed inside a cup-shaped containment body 3. Said containment body 3 comprises a tubular lateral wall 4 comprising a first edge 5 and a second edge 6 at opposite ends. Connected to the first edge 5 there is a bottom portion 7 extending transversally to the lateral wall 4 (and to a central axis of the capsule 1) and therefore closing the housing chamber 2 on one side. At the second edge 6 the lateral wall 4 forms a radial flange 8 extending outwards from the capsule 1 and to which a closing element 9 is fixed (advantageously by sealing or gluing), the closing element also extending transversally to the central axis and therefore closing the other side of the housing chamber 2 at what, at least during the capsule 1 production step, is an access opening for accessing the housing chamber 2 delimited by the second edge 6 of the lateral wall. In fact, during production of the capsules, the access opening is used to fill the housing chamber 2 before the closing element 9 is fixed in place.

As is described in more detail below, the bottom portion 7 is intended, in use, to constitute the infeed section for feeding the hot water into the capsule 1, advantageously after it has been pierced by the device used.

In turn, the closing element 9 is intended to constitute, in use, an outfeed section for the beverage, advantageously after it has been pierced by the device used.

According to the innovative aspect of this invention, the capsule 1 also comprises a filter element 10 which is permeable to water and not to the powdered substance (at least with reference to the average particle size measurement of said substance or most of the range of particle size measurements of it) which is positioned inside the chamber 2 between the powdered food substance and the bottom portion 7. In particular, the filter element 10 is simply resting on the bottom portion 7 and is therefore free to move away from the bottom portion 7, therefore towards the inside of the chamber 2 or towards the closing element 9, except for the resistance applied by the powdered food substance (in fact, the movement of the filter element 10 may generally only be achieved by partly compressing the powdered food substance).

Advantageously, in terms of size and/or the materials used, the filter element 10 is made in such a way that, in use, a piercing element of the beverage making device in which the capsule 1 is intended to be used, which is inserted through the bottom portion 7, causes the filter element 10 to move towards the closing element 9 without piercing it, or at least without completely piercing it.

In the preferred embodiment, the filter element 10 comprises, but advantageously is constituted of, at least one layer of material which is permeable to water, preferably such as non-woven fabric or another similar material (such as fine synthetic fibres, for example of polyester, which have been compacted). In the case illustrate in the accompanying drawings, the filter element 10 is constituted of a disk of material permeable to water whose extent is substantially equal to that of the bottom portion 7.

In particular, advantageously it is a disk which is approximately 2 mm thick, constituted of a non-woven material made of polyester fibres, having a density of 0.1 $g/cm^3$ and weight per unit of surface area of approximately 200 $g/m^2$. It also has a permeability to air measured at 200 Pa of 810 $l/dm^2$ min. Moreover, in the preferred embodiment, the layer of material permeable to water has a thickness equal to at least five times the average thickness of the bottom portion 7. In fact, in that way it is possible to guarantee that the layer has a resistance to piercing and tearing which is significantly greater than that of the bottom portion 7, so that the piercing means which pierce the bottom portion 7 are not able to pierce the filter element 10 (however, that result is also obtained thanks to the fact that, during piercing, whilst the bottom portion 7 is substantially kept stationary by locking in place the capsule 1, and therefore the lateral wall 4 to which the bottom portion 7 is connected, in the device used, the filter element 10 is substantially free to move).

However, in an alternative embodiment it may also be the case that the filter element 10 in contrast comprises a rigid or semi-rigid pierced body, made of plastic material.

In all of the preferred embodiments, the filter element 10 substantially has an extent corresponding to that of the entire bottom portion 7, and/or has a permeability to water which is substantially uniform over its entire extent.

In the embodiment illustrated, the lateral wall 4 is advantageously constituted of a rigid or semi-rigid plastic material.

In accordance with an embodiment not illustrated, the bottom portion 7 is entirely constituted of the same material as the lateral wall 4, and the lateral wall 4 and the bottom portion 7 form a single piece.

In contrast, according to the preferred embodiment illustrated in the accompanying drawings, the bottom portion 7 comprises at least a first sheet 11 of a material having a resistance to piercing and tearing which is less than that of the material constituting the lateral wall 4. Advantageously, the first sheet 11 comprises at least one layer of aluminium.

Moreover, in the preferred embodiment, the bottom portion 7 also comprises a rigid or semi-rigid annular zone 12 forming a single piece with the lateral wall 4 and extending radially towards the central axis from the first edge 5 of the lateral wall 4. The first sheet 11 is fixed to the annular zone 12 either on the outside of the capsule 1 (FIGS. 1 to 4) or on the inside of the capsule 1 (FIGS. 5 to 8), preferably by sealing or gluing.

The closing element 9 is also constituted of a second sheet of material having a resistance to piercing and tearing which is less than that of the material constituting the lateral wall 4, advantageously the same as or similar to the first sheet 11.

Finally, this invention also relates to a system 13 for making beverages which comprises both a capsule 1 of the type described above, and an extraction device 14 for making a beverage by making a flow of hot water pass through the capsule 1.

While the device 14 in itself is similar to prior art devices, its interaction with the capsule 1 constitutes another innovative aspect of this invention.

The device 14 comprises a first part 15 comprising a housing 16 for the capsule 1, and a second part 17. Advantageously, in the preferred embodiment, the housing 16 is also substantially mainly cup-shaped and comprises an upper insertion opening 18 surrounded by an annular edge 19 of the first part 15. The housing 16 and the annular edge 19 are shaped in such a way that the capsule 1 can be inserted in the housing 16 with its radial flange 8 resting on the annular edge 19. In contrast, the second part 17 is advantageously shaped in such a way that it constitutes a kind of lid couplable to the annular edge 19 for closing the housing 16.

The first part 15 and the second part 17 are mobile one relative to the other between an operating position in which they clamp between them a capsule 1 inserted in the housing 16, and a home position in which they allow the insertion and removal of the capsule 1 respectively in and from the housing 16. In the embodiment illustrated, in the operating position the flange 8 of the capsule 1 remains clamped between the second part 17 and the annular edge 19 of the first part 15 (FIGS. 4, 7 and 8), in such a way as to create a watertight seal.

One or more piercing elements 20 are associated with the housing 16 for piercing the bottom portion 7 of a capsule 1 inserted in the housing 16, at least when the first part 15 and the second part 17 are in the operating position. In the embodiment illustrated, the piercing elements 20 are three metal blades (not necessarily sharp) which are fixed on the bottom of the housing 16. However, in other embodiments, they may have a different form. Water feeding means are operatively associated with the housing 16 for in use supplying water into the capsule 1, through the bottom portion 7 pierced by the one or more piercing elements 20. For that purpose, in the preferred embodiment the feeding means comprise a duct 21 for the water which leads into the housing 16 at the piercing elements 20.

There are also piercing means designed to pierce the closing element 9 at least when the capsule 1 is inserted in the housing 16, the first part 15 and the second part 17 are in the operating position and the pressure in the chamber 2 exceeds a predetermined value. In the embodiment illustrated, the piercing means comprise a plurality of raised elements 22 fixed to the second part 17, against which the closing element 9 can tear when the pressure inside the capsule 1 increases to a predetermined value following the supplying of pressurised hot water into the chamber 2.

Associated with the piercing means there are beverage supplying means which allow the flow of the beverage, which comes out through the closing element 9, to the outside of the device 14 (in the embodiment illustrated the beverage supplying means comprise a duct not illustrated which passes through the second part 17).

Figure 4:
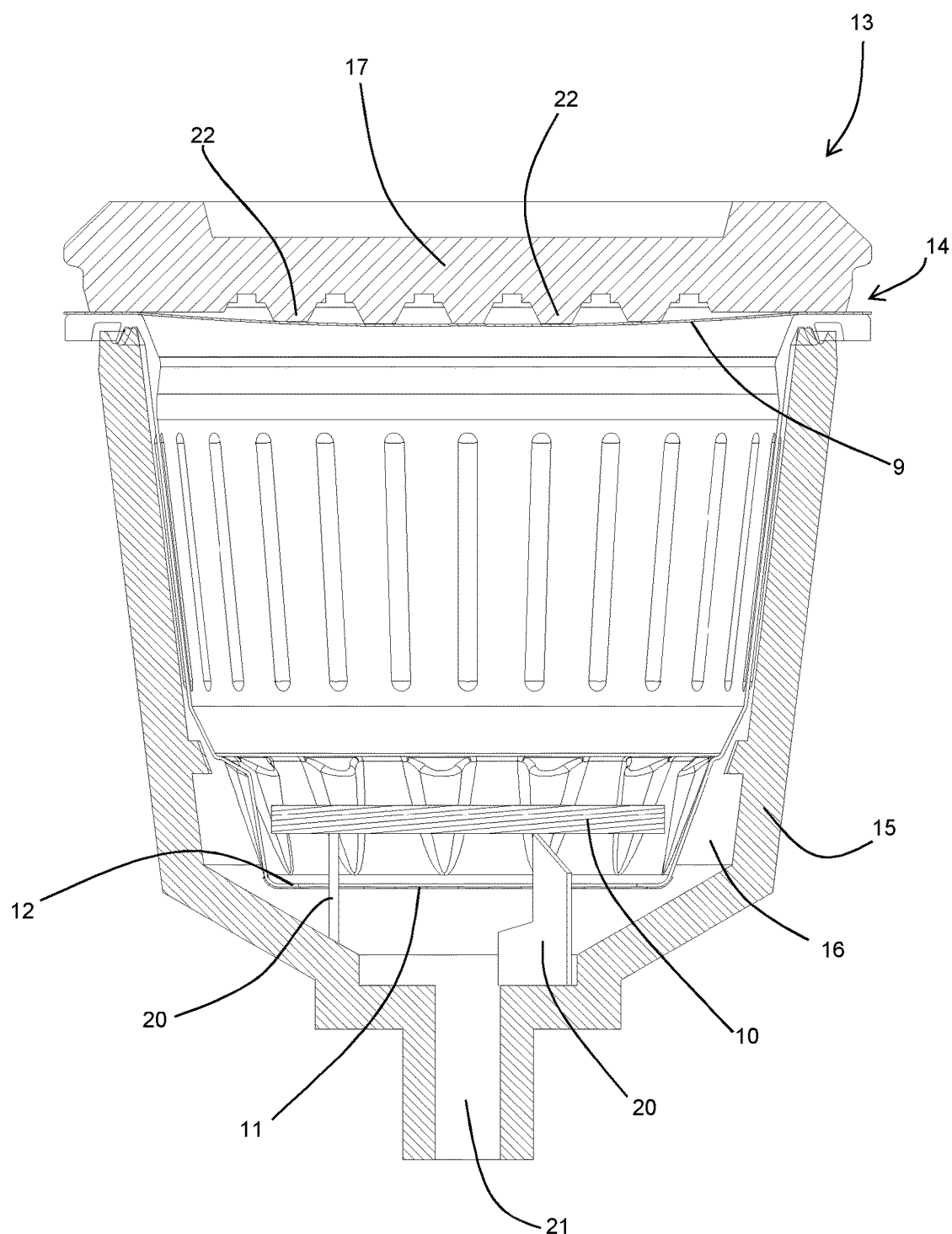
FIG. 4 is a schematic view of both the capsule and the device of FIG. 3, with the device in an operating configuration.
Figure 5:
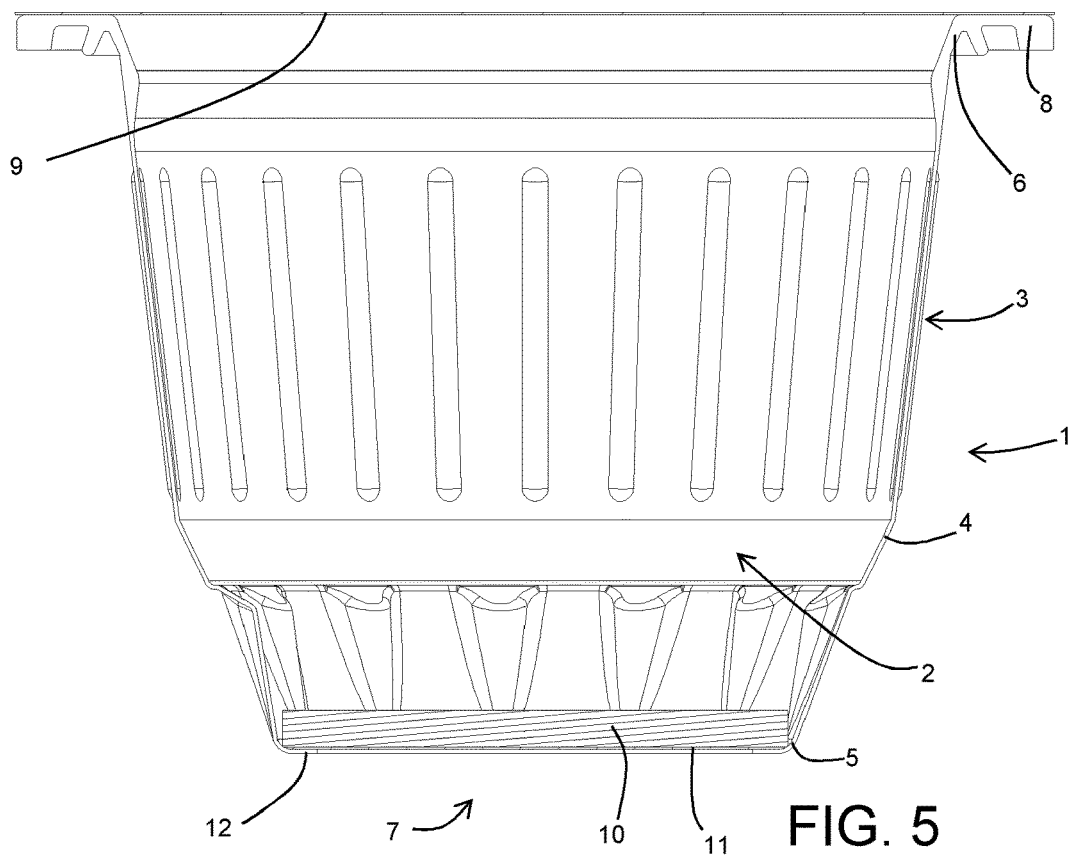
FIG. 5 is a schematic axial section of a second embodiment of a capsule made according to this invention.
Figure 6:
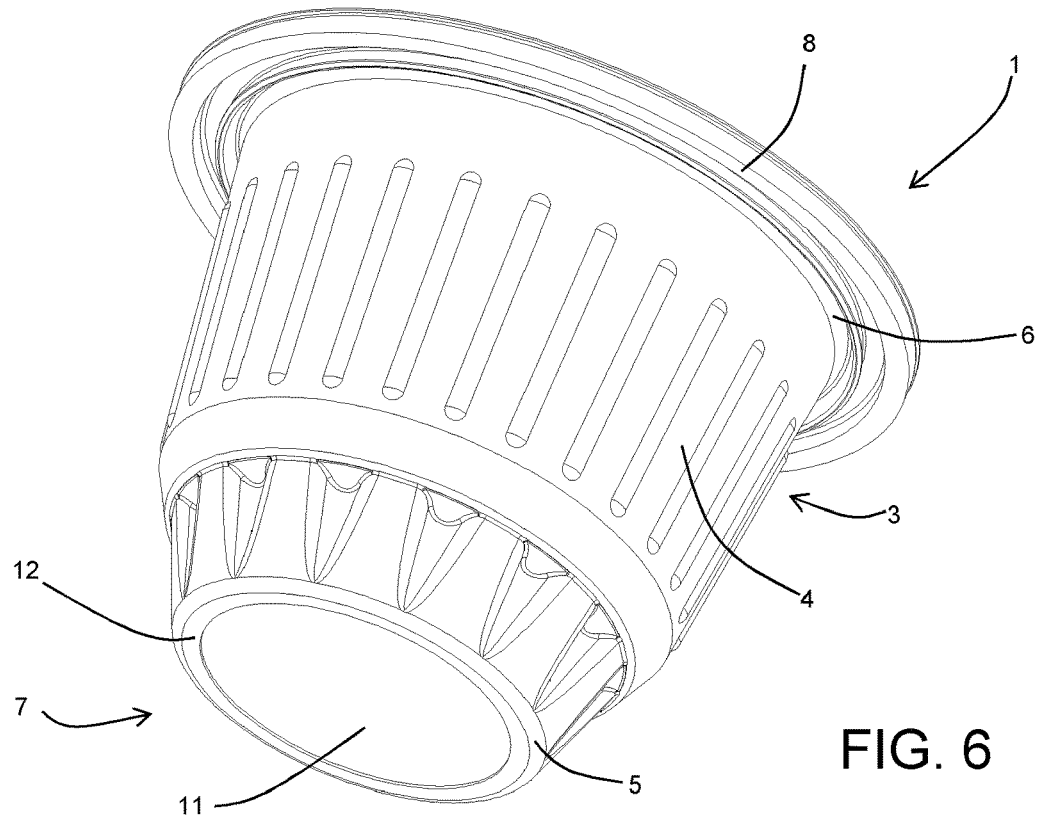
FIG. 6 is an axonometric bottom view of the capsule of FIG. 5.

As already indicated, according to this invention, when the capsule 1 is inserted in the housing 16, and the first part 15 and the second part 17 are in the operating position, the one or more piercing elements 20 completely pass through the bottom portion 7 and are in contact with the filter element 10. In more detail, depending on the circumstances and/or the embodiments, according to this invention either the piercing elements 20 do not pierce the filter element 10 at all (FIGS. 4 and 7), or they partly pierce it but without completely passing through it (FIG. 8). However, in both cases advantageously, in the operating position, the piercing elements 20 hold the filter element 10 away from the bottom portion 7 (FIGS. 4, 7 and 8).

Figure 7:
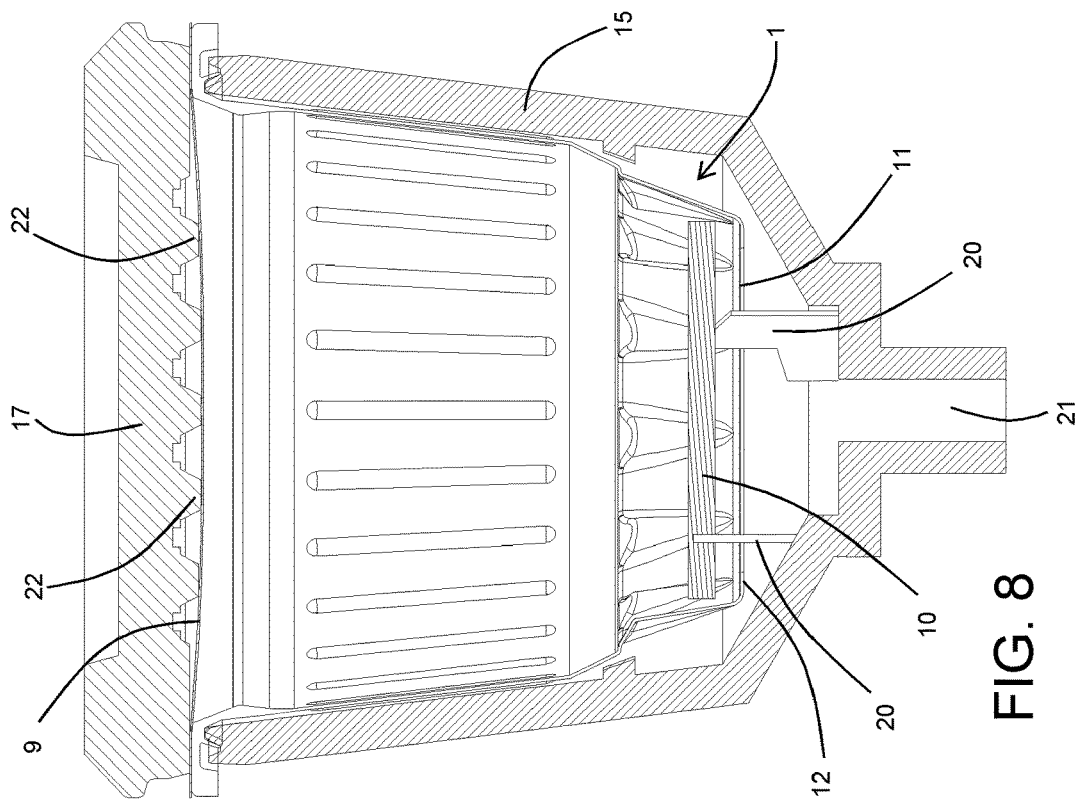
FIG. 7 is an axial section of the capsule of FIG. 5 inserted in a device according to this invention, positioned in an operating configuration.
Figure 8:
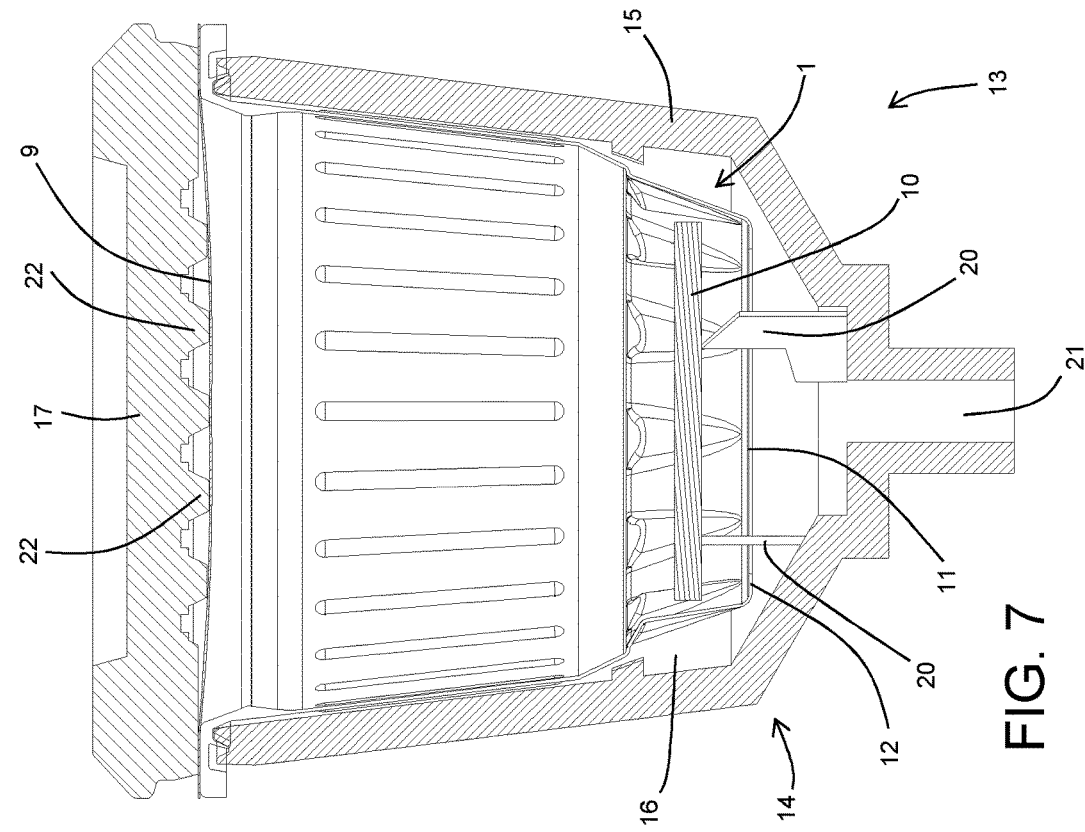
FIG. 8 shows an alternative embodiment of what is illustrated in FIG. 7.

Moreover, from an operating viewpoint, during the passage of the first part 15 and the second part 17 from the home position to the operating position (an intermediate position between the two is shown in FIG. 7), the one or more piercing elements 20 first pass through the bottom portion 7 creating one or more holes in it, then make contact with the filter element 10 and are only partly inserted in it without completely passing through it and/or they cause the filter element to move away from the bottom portion 7.

Finally, in the preferred embodiment, in which the bottom portion 7 comprises an annular zone 12 fixed to the lateral wall 4 and a first sheet 11 fixed to it, the annular zone 12 delimits an aperture such that when the capsule 1 is inserted in the housing 16 of the device 14, and the first part 15 and the second part 17 are in the operating position, the piercing elements 20 pass through the bottom portion 7 only at the first sheet 11, without cutting into or affecting the annular zone 12.

In terms of operation, when the capsule 1 is inserted in the housing 16, initially it rests with the bottom portion 7 on the piercing elements 20, and the radial flange 8 remains at a distance from the annular edge 19. Then, the definitive passage of the first part 15 and the second part 17 to the operating position clamps the flange 8 on the annular edge 19 and forces the bottom portion 7 against the piercing elements 20, tearing it. As soon as the piercing elements 20 pass through the bottom portion 7 they make contact with the filter element 10 and push it away from the bottom portion 7, overcoming the resistance of the powdered substance which may therefore be partly compressed. Depending on the equilibrium reached between the thrust applied by the piercing elements 20 and the resistance of the powdered substance, and depending on the material constituting the filter element 10, at least at the zone of contact with the piercing elements 20, either the piercing elements 20 do not cut into or affect the filter element 10 at all, or they partly pierce it but without completely passing through it.

Once the first part 15 and the second part 17 are in the operating position, the feeding means begin supplying hot water into the housing 16 and from the housing into the chamber 2 through the holes made by the piercing elements 20.

Once the water has entered the capsule 1 and is located in the free space between the filter element 10 and the bottom portion 7, the filter element 10 acts as a distributor for the water. In fact, the water can pass through the filter element 10 at the entire surface of the filter element 10, thereby being evenly distributed in the entire volume of the powdered substance. Moreover, part of the water may reach the powdered substance located along the lateral wall 4, spreading into it directly through any gap which may be present perimetrically between the filter element 10 and the lateral wall 4. This invention brings important advantages.

First, thanks to this invention it was possible to provide a capsule for making beverages which guarantees that all of the powdered substance is made thoroughly wet for the entire duration of beverage supplying, since the presence of the filter elements prevents the formation of preferential channels for the water, as occurs, in contrast, in prior art capsules.

Second, thanks to the movement of the filter element, it is possible to obtain partial compression of the powdered substance, therefore improving its extraction after the subsequent passage of the hot water.

Finally, once supplying is complete, the filter element can also prevent the powdered substance from accidentally coming out of the capsule.

Finally, it should be noticed that this invention is relatively easy to produce and that even the cost linked to implementing the invention is not very high. The invention described above may be modified and adapted in several ways without thereby departing from the scope of the inventive concept. Moreover, all details of the invention may be substituted with other technically equivalent elements and the materials used, as well as the shapes and dimensions of the various components, may vary according to requirements.

The invention claimed is:

1. A system for making beverages comprising an extraction device (14) and a capsule (1) for making beverages, the capsule being intended to be used in the extraction device by making a flow of hot water pass through the capsule, wherein the capsule (1) comprises:
   a cup-shaped containment body (3) which inside it forms a chamber (2), the containment body (3) comprising a bottom portion (7) and a lateral wall (4), the lateral wall (4) being connected to the bottom portion (7) and forming an access opening for accessing the chamber (2);
   a powdered food substance, contained in the capsule and housed in the chamber (2), the powdered food substance allowing a beverage to be made by passing hot water through it;
   a closing element (9) fixed to the lateral wall (4) at the access opening for closing it;
   a filter element (10) which is permeable to water and is positioned inside the chamber (2) between the powdered food substance and the bottom portion (7), the filter element (10) resting on the bottom portion (7) and being free to move away from the latter towards the inside of the chamber (2), except for the resistance applied by the powdered food substance, in such a way that the whole filter element (10) is movable between a first position, in which the filter element (10) rests on the bottom portion (7), and a second position, in which the whole filter element (10) is spaced apart from said bottom portion (7);
the bottom portion (7) of the capsule (1) constituting, in use, an infeed section for feeding hot water into the capsule (1) and the closing element (9) of the capsule (1) constituting, in use, an outfeed section through which the beverage can come out of the chamber (2);
wherein the extraction device (14) comprises:
   a first part (15) comprising a housing (16) for the capsule (1), and a second part (17), the first part (15) and the second part (17) being mobile one relative to the other between an operating position in which they clamp between them the capsule (1) inserted in the housing (16), and a home position in which they allow the insertion and removal of the capsule (1) respectively in and from the housing (16);
   one or more piercing elements (20) associated with the housing (16) for piercing the bottom portion (7) of the capsule (1) inserted in the housing (16) at least when the first part (15) and the second part (17) are in the operating position;

water feeding means operatively associated with the housing (16) for in use supplying water into the capsule (1) through the bottom portion (7) pierced by the one or more piercing elements (20);

piercing means designed to pierce the closing element (9) at least when the capsule (1) is inserted in the housing (16), the first part (15) and the second part (17) are in the operating position and the pressure in the chamber (2) exceeds a predetermined value;

wherein, when the capsule (1) is inserted in the housing (16) and the first part (15) and the second part (17) are in the operating position, the one or more piercing elements (20) hold the whole filter element (10) in the second position in which the whole filter element (10) is spaced apart from the bottom portion (7).

2. The system according to claim 1, characterised in that the powdered food substance housed in the chamber (2) is partly compressible, the powdered food substance being partly compressed when the filter element (10) is spaced apart from said bottom portion (7).

3. The system according to claim 1, characterised in that the filter element (10) is sized and made of materials such that, in use, said one or more piercing elements (20) of the extraction device cause the filter element (10) to move into the second position without completely piercing the filter element (10), the one or more piercing elements (20) being only partly inserted in the filter element (10) without completely passing through it.

4. The system according to claim 1, characterised in that the filter element (10) comprises at least one layer of material which is permeable to water.

5. The system according to claim 4, characterised in that the layer of material permeable to water is made of non-woven fabric or of compacted fine synthetic fibres.

6. The system according to claim 4, characterised in that the layer of material permeable to water has a thickness equal to at least five times the average thickness of the bottom portion (7).

7. The system according to claim 4, characterised in that the layer of material permeable to water is a rigid or semi-rigid pierced body and is made of plastic material.

8. The system according to claim 1, characterised in that the bottom portion (7) comprises at least a first sheet (11) of a material having a resistance to piercing and tearing which is less than that of the material constituting the lateral wall (4).

9. The system according to claim 8, characterised in that the bottom portion (7) also comprises a rigid or semi-rigid annular zone (12) forming a single piece with the lateral wall (4) and to which said at least one first sheet (11) is fixed.

10. The system according to claim 1, characterised in that a gap is present perimetrically between the lateral wall (4) and the filter element (10) when the whole filter element (10) is moved away from the bottom portion (7) and is spaced apart therefrom, so that, in use, part of the water fed through the bottom portion (7) may reach directly the powdered food substance inside the chamber (2) through the gap.

11. The system according to claim 1, characterised in that during the passage of the first part (15) and the second part (17) from the home position to the operating position, the one or more piercing elements (20) first pass through the bottom portion (7) creating one or more holes in it, then make contact with the filter element (10) and they cause the whole filter element to move away from the bottom portion (7) into the second position.

12. The system according to claim 1, characterised in that the bottom portion (7) comprises at least a first sheet (11) of a material having a resistance to piercing and tearing which is less than that of the material constituting the lateral wall (4), in that the bottom portion (7) also comprises a rigid or semi-rigid annular zone (12) forming a single piece with the lateral wall (4) and to which said at least one first sheet (11) is fixed, and in that the annular zone (12) delimits an aperture such that when the capsule (1) is inserted in the housing (16) of the device (14), and the first part (15) and the second part (17) are in the operating position, the piercing elements (20) pass through the bottom portion (7) only at the first sheet (11), without affecting the annular zone (12).

13. The system according to claim 2, characterised in that the filter element (10) is sized and made of materials such that, in use, a piercing element of a beverage making machine in which the capsule (1) is intended to be used, which is inserted through the bottom portion (7), causes it to move towards the closing element (9) without completely piercing it.

14. The system according to claim 2, characterised in that the filter element (10) comprises at least one layer of material which is permeable to water.

15. The system according to claim 2, characterised in that the bottom portion (7) comprises at least a first sheet (11) of a material having a resistance to piercing and tearing which is less than that of the material constituting the lateral wall (4).

16. The system according to claim 2, characterised in that a gap is present perimetrically between the lateral wall (4) and the filter element (10) when the whole filter element (10) is moved away from the bottom portion (7) and is spaced apart therefrom, so that, in use, part of the water fed through the bottom portion (7) may reach directly the powdered food substance inside the chamber (2) through the gap.

17. The system according to claim 11, characterised in that, during the passage of the first part (15) and the second part (17) from the home position to the operating position, the one or more piercing elements (20) are only partly inserted in the filter element (10) without completely passing through it.

* * * * *